May 14, 1963 S. KELLY ETAL 3,089,922

NOVEL MOUNTING SHEATH FOR PIEZOELECTRIC PHONOGRAPH CARTRIDGE

Filed July 26, 1955 2 Sheets-Sheet 1

May 14, 1963 S. KELLY ETAL 3,089,922

NOVEL MOUNTING SHEATH FOR PIEZOELECTRIC PHONOGRAPH CARTRIDGE

Filed July 26, 1955 2 Sheets-Sheet 2

United States Patent Office 3,089,922

Patented May 14, 1963

3,089,922

NOVEL MOUNTING SHEATH FOR PIEZO-ELECTRIC PHONOGRAPH CARTRIDGE

Stanley Kelly, Forty Hill, Enfield, Alec Schumann, Clay Hill, Enfield, and John Nelson Adams, Enfield, England, assignors to Cosmocord Limited, Enfield, England, a British company

Filed July 26, 1955, Ser. No. 524,406
4 Claims. (Cl. 179—100.41)

This invention relates to transducers suitable for use in gramophone pickups, and to gramophone pickups incorporating such transducers.

In accordance with a feature of the invention in a transducer, such as a gramophone pickup, of the piezo-electric type relying for its operation for the deformation of a transducer element, said element is mounted in a compliant sheath, or pocket, the material of said sheath or pocket at different parts thereof having different moduli of elasticity.

Figures 1, 2, 3:
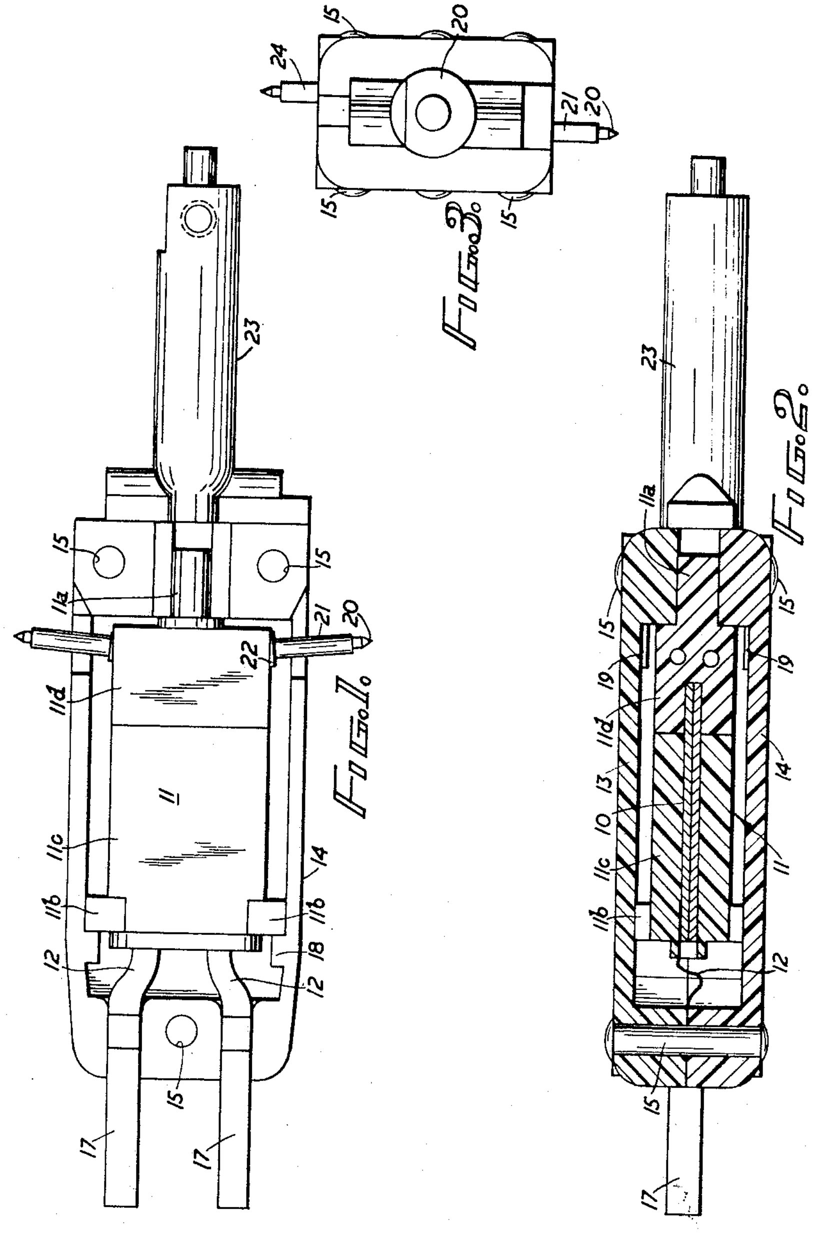
Figure 4:
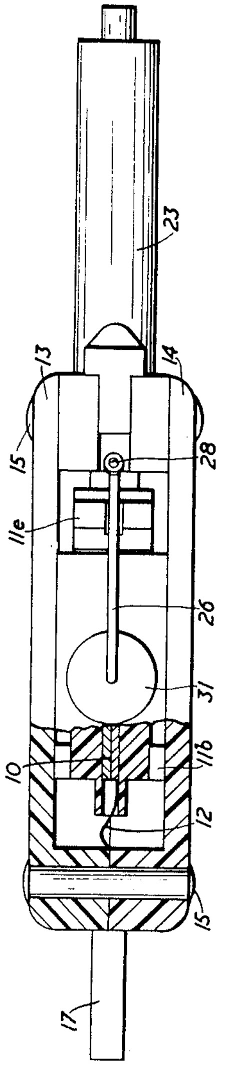
Figure 5:
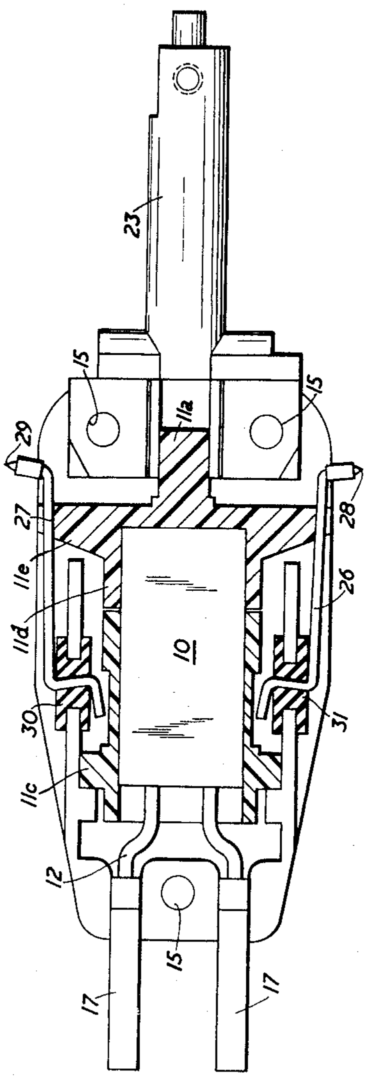

These and other features and advantages of the invention will be apparent from the following description of embodiments of the invention given by way of example, in conjunction with the accompanying drawings in which:

FIGURE 1 is a side elevation of a pickup cartridge, with one part of the case removed, FIGURE 2 is a cross-section of the cartridge of FIGURE 1, taken on the line 2—2, FIGURE 3 is an end elevation of the same cartridge, FIGURE 4 is a cross-section of an alternative cartridge, and FIGURE 5 is a plan, partly in section, of the cartridge of FIGURE 4.

This embodiment of the invention takes the form of a gramophone pickup using a piezo-electric transducer element 10 of the "twister" bimorph type, using, in this case, Rochelle Salt. The bimorph 10 is of retcangular shape and is electroded and sealed in the usual way.

This element is mounted within a pocket or sheath 11 of a synthetic plastic material; the sheath is also generally rectangular, with a recess to receive the transducer extending from the left hand face in FIGURES 1 and 2 so that the element is virtually embedded in the sheath. Flexible conductor leads 12 extend from this face of the sheath, which can be identified as the rear face. From the opposite, front, face of the sheath extends a central cylindrical projection 11*a* adapted to form a pivot pin for the front end of the transducer, and round the edge of the rear face extends outwardly a short flange 11*b*. As will appear hereinafter, this flange may not be of constant thickness, and as shown is interrupted.

The transducing element is mounted in a casing. This resembles the casing described in British Patent No. 723,964, and is moulded in two parts 13, 14 held together by rivets 15. When so riveted together an approximately rectangular space is defined within which the transducer is located. The transducer is supported by the flange 11*b* round the rear face of the sheath which engages the wall of the space in the casing, and by the pivot projection 11*a* on the front face of the sheath, a corresponding recess being formed in the casing to receive it. When the transducer is supported in the casing in this way, the transducer is restrained only by the flange at the rear of the sheath and to a small extent by the pivot. Electrical connecting terminals 17 are secured in the rear of the casing; to which the flexible conductors 12 are attached as by conductive cement.

Lugs or projections 18 are also formed in the casing with the object of locating and retaining the transducer in position. Thus lugs may be formed to engage the flange on the sheath, to prevent the transducer moving forwardly. In addition lugs 19 normally clear of the sheath, can be provided to act as stops to prevent excessive lateral motion.

For an output to be obtained from the transducer a stylus must be coupled to drive the element, and this is effected by mounting the stylus 20 in the end of a straight stylus carrier 21 consisting of a small diameter light alloy tube or rod. The stylus is of the "permanent" sapphire or like type and is swaged into the end of the carrier. A small flange 22 is formed along the length of the carrier.

The stylus is coupled to the element by being inserted in a recess in the front end of the sheath, so that the carrier lies close to, and roughly parallel to, the front edge of the element, but is separated from it by a small thickness of the compliant material of the sheath. The carrier 21 is merely a friction fit in the recess, inward movement being limited by the flange 22 on the carrier, and the stylus end of the carrier projects through a suitable opening in the casing. Alternatively, where it is not convenient to form a flange upon the stylus carrier, a straight carrier can be used, and to prevent the carrier passing through the recess a small metal clip can be fastened to that face of the sheath through which the carrier tends to pass. A U-shaped clip embracing the front end of the sheath, with a hole in it to permit the pivot projection to pass through it, can be used. This alternative arrangement is not shown in the drawings.

The casing is mounted in a suitable pickup head moulding not shown, carried on the end of a support arm in the usual way. It is convenient to mount the transducer with its major dimension horizontal; and in this case the recess in the sheath for the carrier is arranged at a slight angle, so that the stylus is at a slight angle to the vertical, as shown in FIGURE 1.

The construction described lends itself particularly well to a pickup of the dual type having two styli with different tip radii, so that the same transducer can be used with the three recording standards at present in use. For the dual use, the casing is rotatably mounted in the head moulding, in the manner described in the British patent referred to, by a mounting pivot 23 riveted to the casing. A second recess nearly parallel to the first is formed in the sheath near its front face, in which a second stylus carrier 24 is inserted, but from the edge opposite that from which the first is inserted, so that this carrier will project through an opening in the opposite edge of the casing. Either stylus can then be brought into use by turning the casing through 180°. It may also be turned to a "safe" position by being turned through 90°. The two stylus carriers thus mounted are at an angle of about 165° to each other; this gives the desired rake to the styli, and in addition tends to reduce the mechanical coupling between the carriers.

In accordance with a feature of the present invention, the sheath is composed of two or more types of material, having different moduli of elasticity, a more compliant material being used for the rear end 11*c* of the sheath, and a less compliant material for the front, driving end 11*d*. This result can be obtained by moulding the sheath in two separate parts and connecting them together, or alternatively by moulding one part first and then using it as an insert in a mould for the second part. Adequate adhesion between the parts can be obtained in the later case by moistening the insert face with suitable solvent before putting it in the mould.

Suitable materials for the pocket are described in the co-applicant Kelly's U.S. Patent No. 2,862,068.

A pickup of which the transducer has a needle tip compliance of the order of $10^{-6}$ cm./dyne has, until quite recently, been adequate for satisfactory tracing of all modern records, both long-playing and standard. With improvements in recording techniques, the low frequency amplitude, especially on long-playing records, has been considerably augmented and this, together with the small amount of clearance between the upper edge of the groove and the point of contact of the stylus has made it increasingly difficult to secure proper tracing of the groove by a reproducing stylus.

It is possible in any particular design of transducer to obtain correct tracing by increasing the compliance of the stylus, provided that the construction adopted permits this to be done, but an increase of compliance, amongst other things, results in a decrease in output and it is therefore undesirable that the compliance should be any greater than is necessary for tracing. The present invention permits the compliance between the stylus and the transducing element to be controlled and at the same time the nature of the restraint on the crystal can be independently controlled by appropriate choice of materials for the parts 11$c$ and 11$d$ of the sheath.

We have found by experiment that satisfactory tracing of a record is obtained with a stylus having a downward pressure of 10 grams and a compliance of $3\times10^{-6}$ cms./dyne, if the effective mass of the supporting arm is at least 30 grams. This results in the effect that the resonant frequency of the complete system into which the stylus works is about an octave below the lowest recorded frequency. With the specific figures given the resonant frequency is approximately 15 c.p.s.; the lowest recorded frequency is 30 c.p.s.

With existing designs of pickups of the type referred to of which we are aware it is extremely difficult to increase the compliance above $10^{-6}$ cms./dyne, owing to the arrangements used for coupling the stylus to the element. On the other hand, with the present invention the compliance is readily controllable as desired. It is also an advantage especially when using the two styli, that with the construction described the resonant frequency of the stylus and stylus carrier, due to the rigid carrier, can be made very high, and of the order of 20 to 30 kcs./sec.

The usual objection to using a rigid stylus is excessive "needle talk" and wear at high frequencies due to the pinch effect. This pre-supposes that the stylus is rigidly mounted in the vertical direction. If the unit can be made very resilient in the vertical direction so that the compliance is comparable to the lateral compliance (say times 5 or times 10) this objection disappears. In the device described the transmission between the working stylus and the crystal is determined primarily by Young's modulus of the pocket material and by the separation between the working stylus and the crystal end, and so the transmission can be varied by either of these factors. It will be seen that the compliance between the stylus carrier is in part controlled by the stylus carrier itself, so that the use of a longer or shorter carrier will modify the compliance. The compliance can also be modified by the insertion of stiffening members in the body of the sheath, near the carriers themselves.

It is, of course, important that, in addition to tracing a record groove properly, the pickups give an output which permits faithful reproduction. It is convenient also if the pickup gives correct equalisation for the frequency distortion deliberately introduced in recording. Again, the present invention affords a considerable latitude in design in obtaining a desired characteristic. In general the bass response is a function of the restraint of the rear end of the element, and the treble response by the mechanical impedance between the stylus and the element, and the present invention, permitting separate choice of materials for these two parts of the couplings to the element enables these to be selected with a large measure of independence. The rear mounting can also be modified by modification of the proportions of part or all of the flange round the rear face.

In a pickup made as described it has been found possible to achieve a stylus compliance of $4\times10^{-6}$ cms./dyne, producing an output of .7 volt at 1000 c.p.s. on a standard record, and .25 volt on a long-playing record with a needle pressure of 5 grams. With a very simple network, comprising a series combination of a 25 pf. capacitor in parallel with a .5 megohm resistor, and a shunt resistor of .5 megohm, the response is $\pm2$ db up to 13 kcs./sec. and is only 5 db down at 20 kcs./sec. on a standard record.

In the second embodiment of the invention shown in FIGURES 4 and 5, a modified stylus is used. The sheath and the transducing element are generally similar to those described above, except at its front end the sheath is formed with two projections 11$e$ at the end of the upper and lower faces. Two stylus carriers 26, 27 are used; each carrier is in the form of a wire approximately straight along the major part of its length, with one end, which can be called the back end bent at right angles in one direction and its other end, the front end, bent nearly at right angles in the opposite direction. The tip of the bent front end is shaped to a stylus point and is hardened, or, as shown, carries a stylus 28 or 29.

One stylus carrier 28 is mounted by passing the bent back end of the carrier through a hole in a small grommet or bung 30 which is held between the two parts of the casing; the other carrier is similarly mounted in grommet 31. The major part of the length of each carrier is parallel to the length of the element, and approximately in the plane of the element, and is spaced from the edge of the sheath. The front end of each carrier rests in a groove or slot in one of the two projections 11$e$ at the front end of the sheath. By this means, the stylus carrier is coupled to the element through the compliance of the sheath. If desired, instead of using separate grommets 30 and 31 for receiving the rear ends of the stylus carriers, two small projections can be formed on the sheath, projecting through the casing. The arrangement shown is better.

As before, the sheath is made in two parts, the characteristics of which can be selected to give the desired compliance, and the compliance between the carrier and the driving end of the element can be varied by the insertion of stiff wires or the like in recesses in the sheath parallel to the front edge of the element, and as described above.

In both the embodiments described the sheaths have two parts of different characteristics, but if circumstances warrant it further parts can be used.

The devices described thus have the following advantages:

Firstly, the response of the pickup can be accurately controlled in production and predicted during development. The characteristics of the crystal are entirely secondary. This is principally because the pocket compliance is at least 40 times greater than that of the crystal and by using a rigid stylus the resonant frequency can be placed outside the useful frequency range in excess of 20 kcs./sec.

Secondly, the construction is extremely simple and foolproof. There are very few pieceparts in the complete assembly and the reduction in assembly time and the increased precision due to the reduction in assembly parts is immediately apparent.

Thirdly, the crystal, being completely enclosed in the pocket, facilitates the hermetic sealing of the crystal and the whole unit becomes more robust and moisture-proof.

We claim:

1. A gramophone pickup comprising a casing, a piezoelectric element in said casing, a first sheath of compliant plastic material disposed between a first part of said element and a first part of said casing and directly engaging said element and said casing respectively to impose on said element restraint against movement of the said first part thereof with respect to said casing, a stylus, a carrier for said stylus, a second sheath of compliant plastic material directly engaging said element at a second part thereof and directly engaging said casing at a second part thereof, said second sheath permitting vibratory movement of said second part of said element with respect to said casing, said carrier directly engaging said second sheath, thereby to couple said stylus to said element, and the materials of said first and second sheaths having different moduli of elasticity, the material of said second sheath being less compliant than the material of said first sheath.

2. A gramophone pickup according to claim 1, wherein said element is of the 'twister' type, and said second sheath has thereon a projection disposed approximately on the central axis of said element, and said casing has therein a recess to receive said projection, thereby to define a pivotal axis for said element.

3. A gramophone pickup according to claim 1, wherein said carrier is partly embedded in said second sheath, thereby to be coupled thereto and supported wholly thereby.

4. A gramophone pickup according to claim 1, wherein said first and second sheaths are formed as a single member.

References Cited in the file of this patent

UNITED STATES PATENTS

| | | |
|---|---|---|
| 2,570,578 | Martin | Oct. 9, 1951 |
| 2,575,999 | Cordes | Nov. 20, 1951 |
| 2,703,343 | Snepvangers | Mar. 1, 1955 |
| 2,771,515 | Kelly | Nov. 20, 1956 |
| 2,862,068 | Kelly | Nov. 25, 1958 |